(12) United States Patent
Chen et al.

(10) Patent No.: US 11,908,023 B1
(45) Date of Patent: Feb. 20, 2024

(54) METHOD AND SYSTEM FOR GENERATING USER INTERFACES TO PROMPT USERS TO PERFORM AN ACTIVITY IN A SOFTWARE APPLICATION BASED ON TRANSACTION TIME ANALYSIS

(71) Applicant: INTUIT INC., Mountain View, CA (US)

(72) Inventors: Meng Chen, Sunnyvale, CA (US); Lei Pei, Sunnyvale, CA (US); Yueyue Gu, Sunnyvale, CA (US); Zhicheng Xue, Union City, CA (US); Linxia Liao, Freemont, CA (US)

(73) Assignee: Intuit, Inc., Mountain View, CA (US)

( * ) Notice: Subject to any disclaimer, the term of this patent is extended or adjusted under 35 U.S.C. 154(b) by 626 days.

(21) Appl. No.: 16/525,287

(22) Filed: Jul. 29, 2019

(51) Int. Cl.
G06Q 40/12 (2023.01)
H04L 67/306 (2022.01)
G06Q 40/02 (2023.01)
G06F 17/18 (2006.01)

(52) U.S. Cl.
CPC .......... G06Q 40/128 (2013.12); G06F 17/18 (2013.01); G06Q 40/02 (2013.01); H04L 67/306 (2013.01)

(58) Field of Classification Search
CPC ...... G06Q 40/128; G06Q 40/02; G06F 17/18; H04L 67/306
See application file for complete search history.

(56) References Cited

U.S. PATENT DOCUMENTS

| | | | |
|---|---|---|---|
| 8,380,590 B1 * | 2/2013 | Rukonic | G06Q 40/02 705/30 |
| 10,445,152 B1 * | 10/2019 | Zhang | G06F 16/285 |
| 2007/0156546 A1 * | 7/2007 | Oppert | G06Q 40/12 705/30 |
| 2010/0280881 A1 * | 11/2010 | Faith | G06Q 10/06375 705/7.34 |
| 2014/0258899 A1 * | 9/2014 | Mantuano | G06F 3/04883 715/765 |

(Continued)

OTHER PUBLICATIONS

Mohamed Yakout, Ahmed K. Elmagarmid, Hazem Elmeleegy, Mourad Ouzzani, and Alan Qi. 2010. Behavior based record linkage. Proc. VLDB Endow. 3, 1-2 (Sep. 2010), 439-448. (Year: 2010).*

(Continued)

*Primary Examiner* — Nathan A Mitchell
(74) *Attorney, Agent, or Firm* — Patterson + Sheridan, LLP (57) ABSTRACT

Certain aspects of the present disclosure provide techniques for generating a user interface to prompt users of a software application to perform an action in the software application. The method generally includes generating historical transaction time gap data for transactions in the account. A probability distribution is generated based on the historical time gap data. The probability distribution represents a probability that a transaction related to the account has been performed after an elapsed time from a previous transaction. A probability that an unrecorded transaction exists for an account based on the probability distribution and a time difference between a most recent transaction and a current time. The probability that an unrecorded transaction exists is determined to exceed a threshold probability, and a user interface is generated and displayed to a user of the software application including a prompt for the user to enter new transactions for the account.

21 Claims, 6 Drawing Sheets

(56) References Cited

U.S. PATENT DOCUMENTS

| | | | |
|---|---|---|---|
| 2016/0132908 A1* | 5/2016 | von Walstrom | G06Q 30/0255 |
| | | | 705/7.25 |
| 2016/0296797 A1* | 10/2016 | Rosen | G09B 19/0038 |
| 2017/0148020 A1* | 5/2017 | Vienravee | G06Q 20/401 |
| 2017/0286952 A1* | 10/2017 | Gerard | G06Q 20/4016 |
| 2019/0066229 A1* | 2/2019 | Rephlo | G06Q 40/12 |
| 2019/0073669 A1* | 3/2019 | Dutta | G06Q 20/4016 |
| 2019/0147448 A1* | 5/2019 | Allbright | G06Q 20/08 |
| | | | 705/77 |
| 2019/0259095 A1* | 8/2019 | Templeton | G06N 3/0445 |
| 2019/0378207 A1* | 12/2019 | Dibner-Dunlap | G06Q 40/02 |

OTHER PUBLICATIONS

Raghunathan et al. "A Multivariate Technique for Multiply Imputing Missing Values Using a Sequence of Regression Models". Survey Methodology, vol. 27, No. 1. pp. 85-95, Jun. 2001. (Year: 2001).*

Vrushank Vora et al, Cash Management and Forecasting at Scale, Data Science in Fintech Conference at the 2018 ACM SIGKDD Conference on Knowledge Discovery and Data Mining, Aug. 20, 2018, London, UK, 6 pages.

* cited by examiner

METHOD AND SYSTEM FOR GENERATING USER INTERFACES TO PROMPT USERS TO PERFORM AN ACTIVITY IN A SOFTWARE APPLICATION BASED ON TRANSACTION TIME ANALYSIS

INTRODUCTION

Aspects of the present disclosure generally relate to database systems, and more specifically to using transaction time analysis to prompt a user to commit data related to unrecorded transactions to the database.

BACKGROUND

Transaction management systems, such as accounting systems or other systems used to track and maintain records of transactions performed by a user, may rely on automatic entry of transactions from a data connection between a transaction management systems and a transaction data source or manual entry of transactions into the transaction management systems. Automatic entry of transactions from a data firehose may allow for regular entry of transactions into a transaction management system; however, these data connections may exist for a limited number of transaction data sources, meaning that transactions from other data sources may need to be entered manually. Many users may thus need to enter transaction records manually, which may be a time-intensive and error-prone operation. Further, in some cases, while a data connection may exist between a transaction management system and a transaction data source, the data connection may not support automatic retrieval of transaction data from a transaction data source. In these cases, a user may need to manually initiate a transfer of transaction data from the transaction data source to the transaction management system.

Because manual entry of transaction data is a time-intensive operation, users may delay manual entry of transactions into a transaction management system or forget to enter the transaction data altogether. When a user decides to manually enter transactions into the transaction management system, the user may have a large number of transactions to manually enter, which may increase the amount of time needed and thus the burden on the user to commit transactions to the transaction management system.

Accordingly, techniques are needed to analyze transaction data and predicting when transactions are missing in order to prompt a user to enter data into a transaction management system.

BRIEF SUMMARY

Certain embodiments provide a computer-implemented method for generating a user interface to prompt users of a software application to perform an action in the software application. The method generally includes generating, for a user, historical transaction time gap data for transactions in the account. The historical transaction time gap information includes a data set of elapsed times between each successive transaction in the account. A probability distribution is generated based on the historical time gap data. The probability distribution represents a probability that a transaction related to the account has been performed after an elapsed time from a previous transaction. A probability that an unrecorded transaction exists for the account based on the probability distribution and a difference between a time associated with a most recent transaction in the account and a current time. The probability that an unrecorded transaction exists is determined to exceed a threshold probability, and a user interface is generated and displayed to a user of the software application. The user interface generally includes a prompt for the user to enter new transactions for the account.

Other embodiments provide a system comprising a processor and a non-transitory computer-readable memory storing instructions that, when executed by the processor, perform an operation for generating a user interface to prompt users of a software application to perform an action in the software application. The operation generally includes generating, for a user, historical transaction time gap data for transactions in the account. The historical transaction time gap information includes a data set of elapsed times between each successive transaction in the account. A probability distribution is generated based on the historical time gap data. The probability distribution represents a probability that a transaction related to the account has been performed after an elapsed time from a previous transaction. A probability that an unrecorded transaction exists for the account based on the probability distribution and a difference between a time associated with a most recent transaction in the account and a current time. The probability that an unrecorded transaction exists is determined to exceed a threshold probability, and a user interface is generated and displayed to a user of the software application. The user interface generally includes a prompt for the user to enter new transactions for the account.

Still further embodiments provide a computer-readable medium having instructions stored thereon which, when executed, performs an operation for generating a user interface to prompt users of a software application to perform an action in the software application. The operation generally includes generating, for a user, historical transaction time gap data for transactions in the account. The historical transaction time gap information includes a data set of elapsed times between each successive transaction in the account. A probability distribution is generated based on the historical time gap data. The probability distribution represents a probability that a transaction related to the account has been performed after an elapsed time from a previous transaction. A probability that an unrecorded transaction exists for the account based on the probability distribution and a difference between a time associated with a most recent transaction in the account and a current time. The probability that an unrecorded transaction exists is determined to exceed a threshold probability, and a user interface is generated and displayed to a user of the software application. The user interface generally includes a prompt for the user to enter new transactions for the account.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for generating user interfaces to prompt users to perform an action in a software application based on a probability distribution indicating a likelihood that a user has failed to perform a task, such as failing to enter a transaction record in the software application. Generally, the probability distribution may be generated from time gap information derived based on recorded transactions in a data store.

In some embodiments, a probability distribution may be generated as a survival function over a period of time elapsed from a most recent recorded transaction in the data store. The survival function may use the elapsed time from a previous transaction an analogue to a survival duration in the survival function. An elapsed time from the most recent recorded transaction in the data store may correspond to a survival probability, and the survival probability may correspond to a likelihood that unrecorded transactions exist for the user of the software application. Using the generated probability distribution, a likelihood that an unrecorded transaction exists for the user of the software application can be determined based on the time elapsed from a most recent recorded transaction for the user and the current time. If the determined likelihood exceeds a threshold value, a user interface may be generated and displayed to the user to prompt the user to commit unrecorded transactions to the data store.

By using a probability distribution generated from historical transaction time gap information to generate user interfaces that prompt a user to commit transaction data to a data store, embodiments presented herein may reduce an amount of data to be manually entered into or synchronized with a software application at any given time. Reducing the amount of data to be entered into or synchronized with the software application may accelerate data import operations and may increase the accuracy and completeness of data entry into the software application.

Further, as discussed herein, user feedback may be used to modify when a user is prompted to enter transaction data into the software application, which may reduce the frequency at which a user is prompted to enter transaction data into the software application when no unrecorded transactions exist, and increase the frequency at which the user is prompted to enter transaction data into the software when a large number of unrecorded transactions exist. Further, by increasing the completeness and accuracy of data provided to a software application, more robust analyses may be performed on the data. These analyses may result, for example, in the identification of recommended actions that are more relevant to the user than generic recommendations or recommended actions identified from an incomplete or inaccurate data set.

Figure 1:
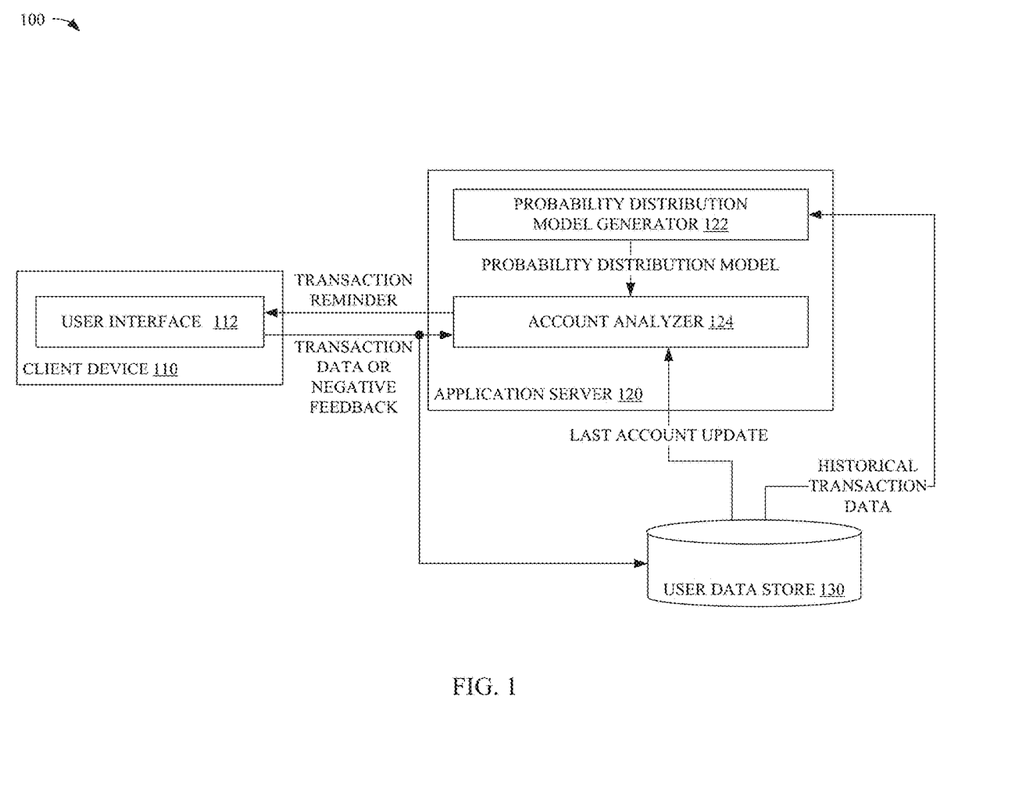
FIG. 1 depicts an example computing environment in which a probability distribution generated from historical transaction time gap data is used to generate user interfaces to prompt entry of transactions into a software application.

Example User Interface Generation to Prompt Users to Record Transactions in a Software Application Based on a Probability Distribution Model FIG. 1 illustrates a computing environment 100 in which probability distributions indicating a likelihood that an unrecorded transaction (e.g., a transaction that has occurred but not accounted for) exists for a user are used to determine when to generate user interfaces prompting a user to provide transaction data to a software application.

As illustrated, computing environment 100 includes a client device 110, application server 120, and user data store 130. Computing environment 100 illustrates the generation of a probability distribution from historical transaction time gap data and the use of the generated probability distribution to determine when to generate and display a user interface prompting a user to enter unrecorded transactions into a software application in a client-server deployment. It should be recognized, however, that the generation of the probability distribution and user interface prompting the user to enter unrecorded transactions may be performed on a client device.

Client device 110 generally hosts a user interface 112 that receives graphical user interface data from application server 120 including one or more fields for entering data to be processed by a software application executing on application server 120 and transmits the entered data to application server 120 and/or user data store 130 for processing and storage.

In some embodiments, a user may invoke a session of the software application executing on application server 120 by providing, through user interface 112, user login credentials for the user's account to application server 120. In some embodiments, as discussed in further detail below, invoking the session of the software application on application server 120 may serve as a trigger for predicting, at the application server, a likelihood that unrecorded transactions exist for the user. If application server 120 determines a sufficient likelihood that unrecorded transactions exist for the user, user interface 112 may receive, from application server 120, information specifying a graphical user interface in which a transaction reminder is displayed to a user of client device 120.

In some embodiments, the graphical user interface may further include one or more user interface elements that allows a user to provide transaction data to software application 120 (e.g., manually or by specifying login credentials for an external service that hosts transaction information) or indicate that no unrecorded transactions exist for the user at the current time. If a user indicates that unrecorded transactions exist for the user's account, the user may thereafter enter the data through user interface 112 and the user-provided transaction data can be transmitted to application server 120 and committed to user data store 130. The user's account may refer to any arbitrary grouping of transactions defined by the user for particular types of transactions.

An indication that unrecorded transactions exist for the user's account may include, for example, a selection of a specific user interface element in the graphical user interface or entry of a non-null record into mandatory transaction data fields in the graphical user interface. An indication that no unrecorded transactions exist for the user's account may include, for example, a selection of a different specific user interface element in the graphical user interface or entry of null values in the mandatory transaction data fields.

In some embodiments, user interface 112 may additionally or alternatively expose a voice assistant to a user of client device 120 that allows a user to invoke the determination using a vocal command (e.g., a natural language utterance indicating that a user is asking whether the user should enter transactions into the software application, if there are unrecorded transactions in the user's account, or other natural language utterances).

Application server 120 generally hosts various components of a software application that records transactions for a user's account and performs various analyses on the recorded transactions. As illustrated, application server 120 includes a probability distribution model generator 122 and an account analyzer 124.

Probability distribution model generator 122 is generally configured to generate a probability distribution representing a likelihood that an unrecorded transaction exists for a user's account given an elapsed time between a timestamp of a most recent transaction in the user's account and the current time. The probably distribution model may be generated using transaction data (or data derived from the transaction data) for a user and/or similar users and similar accounts, as discussed in further detail below. Generally, the probability distribution model may be a monotonically increasing curve in which a likelihood that an unrecorded transaction exists for the user's account approaches 1 (e.g., certainty) as the amount of time elapsed since the most recent transaction in the user's account increases.

To generate the probability distribution model, probability distribution model generator 122 may generate historical transaction time gap data based on historical transaction data in an account stored in user data store 140. Generally, the transaction time gap data may identify, for each pairing of successive transactions in the account, an amount of time elapsed between these successive transactions. The amount of time may be defined as whole units of a specified time period (e.g., hours, days, weeks, etc.) elapsed between successive events based on a granularity of the timestamps recorded in transaction data for the account.

For example, where transactions are associated with timestamps at a daily level of granularity, the transaction time gap data may also be defined in terms of a number of days elapsed between successive transactions. In other examples, where transactions are associated with timestamps at a per-second level of granularity, the transaction time gap data may be defined in terms of a number of seconds elapsed between successive transactions. In still further embodiments, probability distribution model generator can arbitrarily define the level of granularity for the transaction time gap data based, for example, on a type of transaction data being analyzed.

The selected account may be one or both of the user's account and accounts belonging to similar users. For example, if a user's account has a number of entries below a threshold number of entries needed to generate the probability distribution model, probability distribution model generator 122 may identify similar accounts from similar users to use in generating the probability distribution model.

To identify these similar accounts and similar users, probability distribution model generator may use user attributes to identify similar users. For example, in an accounting application, these user attributes may include a company size, a company revenue range, a number of employees, information about an activity undertaken by the company (e.g., industry codes used to classify a company), or other user attributes that may identify similar users. It should be recognized that various similarity models, such as clustering algorithms, can be used to identify similar accounts for a user.

Because users may maintain multiple accounts for different types of transactions, and because different users may associate different labels with accounts for a specific type of transaction, semantic analyses of account names and/or transaction descriptions may be performed to identify specific accounts from the similar users that are relevant for the generation of the probability distribution model for the user's specific account. For example, consider an account used to track obligations related to rented real estate for a company. Users of the software application may use various labels for this type of account, including "Rent", "Office Rent", "Rent for [address]", "Lease", or other similar labels. To allow probability distribution model generator 122 to identify accounts used to track similar types of transactions, natural language word embeddings may be generated based on known account names for users of the software application. These natural language word embeddings, such as word vectors generated by the Word2Vec model, can be used to identify semantically similar strings to a given input string. Returning to the rental real estate obligations example discussed above, the natural language word embeddings may generate a vector in which "Rent", "Office Rent", "Rent for [address]", "Lease", and other account labels used by users of the software application to track transactions related to rental real estate are determined to be semantically similar. For a new user with an account named "Rented Office", the natural language word embeddings may determine that the account name of "Rented Office" is semantically similar to the other rented real estate-related accounts and thus select the rented real estate-related accounts from similar users for use in generating the historical time gap data.

In some embodiments, probability distribution model generator 122 may periodically or aperiodically update the probability distribution model for the user. During update operations initiated by the probability distribution model generator 122, probability distribution model generator can examine the number of transactions in a user's account to determine whether a sufficient number of transactions exist for the user. If a sufficient number of transactions are determined to exist, probability distribution model generator 122 can discard the model generated for the user from transaction data in similar accounts for similar users and generate a new probability distribution model based on the transactions in the user's account. In some embodiments, the new probability distribution model may be based on both the user's transaction data and transaction data from similar users.

In some embodiments, a probability distribution model may be generated based on a survival analysis of the transaction time gaps between different transactions in a user's account or accounts belonging to similar users, where the length of the transaction time gap corresponds to a survival time in the survival analysis. The transaction time gap data may be used to generate a stepwise distribution for any multiple of a base amount of time (e.g., any number of days elapsed from a most recent transaction). In some embodiments, the stepwise distribution may be generated using techniques such as the Kaplan-Meier method, which computes the number of times an unrecorded transaction exists at any given multiple of the base amount of time. In some embodiments, the stepwise distribution may be inverted such that a 100% survival rate (e.g., no unrecorded transactions exist after a given elapsed time from the most recent transaction) corresponds to a 0% probability in the probability distribution model and that a 0% survival rate corresponds to a 100% probability in the probability distribution model.

In some embodiments, probability distribution model generator 122 can smooth the stepwise distribution into a probability curve using a smoothing function. For example, the stepwise distribution may be smoothed using a Weibull distribution to fit a probability distribution curve to the stepwise distribution. The probability distribution curve may be provided to account analyzer 124 for use in determining whether it is likely that unrecorded transactions exist for a user's account and generate a user interface prompting a user to enter transactions for the user's account, as discussed in further detail below with respect to FIG. 4.

Generally, the probability distribution models generated by probability distribution model generator 122 may be generated for many users and for many different accounts maintained by the same user. These models may be stored for future retrieval and use by application server 120 (e.g., locally or in a remote data store) and associated with specific users of a software application hosted by application server 120. By storing the generated models and associating probability models with specific users, predictions of whether unrecorded transactions exist for a user's account may be performed using an already-generated model. The model need not be generated each time the software application hosted by application server 120 determines whether unrecorded transactions exist for a user in order to determine whether to generate a user interface to prompt the user to enter transactions for the user's account.

Account analyzer 124 uses the generated probability distribution model and elapsed time from a most recent transaction in the user's account to determine whether the user should be prompted to enter transactions into the software application executing on application server 120. To determine whether to generate a user interface to prompt the user to enter transactions into the software application, account analyzer 124 can determine an elapsed time from the most recent transaction in the user's account and identify the probability value in the probability distribution model associated with the determined elapsed time. If the probability value, representing a likelihood that unrecorded transaction exists in the user's account for a specific account, exceeds a threshold value, account analyzer 124 can determine that the user should be prompted to enter transactions for the account into the software application. Based on this determination, account analyzer 124 can generate a user interface to prompt the user to enter transactions into the account. The generated user interface may be, for example, generated as a markup file (e.g., HTML, XML, etc.) including information identifying user interface elements to be displayed on client device 110, size and position of those elements, and other information defining the look and feel of the generated user interface.

In some embodiments, account analyzer 124 may additionally pre-fill certain transaction data fields in the generated user interface with transaction details predicted from the user's transaction history. For example, account analyzer 124 can use the elapsed time and historical time gap information to predict a transaction date and description for an unrecorded transaction. For example, suppose that a user pays rent on average every 30 days and the elapsed time since the last transaction in the account is 31 days. Account analyzer 124 can, after predicting that an unrecorded transaction exists in the user's account, determine that the most likely transaction date is the date of the last transaction plus 30 days and that the most likely transaction description is a description previously used for a previous rental transaction.

Account analyzer 124 receives feedback from client device 120 including a new transaction to analyze and commit to user data store 130 or negative feedback indicating that no unrecorded transactions exist for the user's account.

In some embodiments, when account analyzer 124 receives information about a new transaction, account analyzer 124 can predict a range of values associated with the transaction (e.g., a range of values associated with a given expenditure) and compare the received transaction data to the predicted range of values. If the received transaction data falls outside of the predicted range of values, account analyzer 124 can generate and transmit to client device 110 an alert indicating that the received transaction data is outside of a predicted range of values and request that the user confirm that the received transaction data is correct or update the transaction record. In some embodiments, account analyzer 124 can additionally predict a transaction value and pre-fill an account value field with the predicted value.

In some embodiments, account analyzer 124 can use the information received from client device 110 to adjust the probability distribution model for future predictions of whether unrecorded transactions exist for the user's account. If an unrecorded transaction exists for the user's account, account analyzer 124 can adjust the probability distribution model upwards (e.g., apply an upwards correction factor to the probability distribution model) such that the likelihood that an unrecorded transaction exists for the user's account after a given elapsed time increases. If, however, the user indicates that no unrecorded transactions exist for the user's account in response to the generated prompt, account analyzer can adjust the probability distribution model downwards (e.g., apply an downwards correction factor to the probability distribution model) such that the likelihood that an unrecorded transaction exists for the user's account after a given elapsed time decreases.

Figure 2:
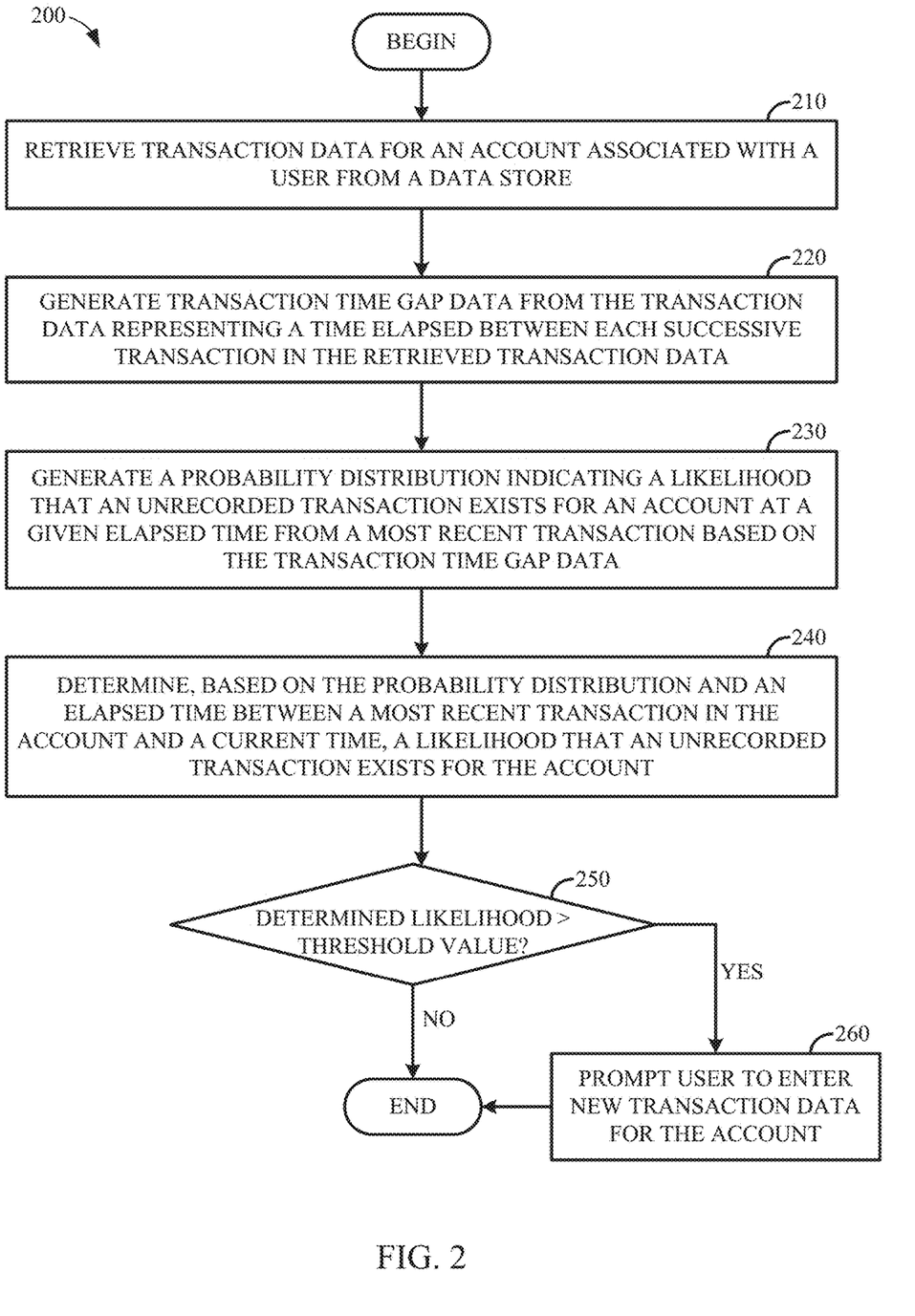
FIG. 2 illustrates example operations for generating user interfaces to prompt user entry of transactions into a software application based on a probability distribution generated from historical transaction time gap data.

Example Computer-Implemented Method for User Interface Generation to Prompt Users to Record Transactions in a Software Application Based on a Probability Distribution Model FIG. 2 illustrates example operations 200 for generating user interfaces to prompt a user to record transactions in a software application based on a likelihood that an unrecorded transaction exists for the user. The operations described herein may be performed on an application server hosting a software application (e.g., application server 120 illustrated in FIG. 1) or on a client device on which a self-contained application is installed (e.g., client device 110 illustrated in FIG. 1).

As illustrated, operations 200 begin at block 210, where a system retrieves transaction data for an account associated with a user from a data store. The data store may be a remote data store (e.g., where a software application executes on an application server and is remotely accessed by a client device) or a local data store (e.g., where a software application executes on the client device). Generally, the system can retrieve transaction data by querying for the contents of a specific portion of the data store associated with the user and the account. For example, where different accounts are stored in different database tables, the system can retrieve the transaction data by querying for all records in a specific database table. In another example, where different accounts are aggregated in a single database table and where each transaction record is associated with a foreign key identifying a specific account that the transaction belongs in, the system can retrieve the transaction data by querying for all records in the single database table associated with the foreign key identifying a specific user and account. The account may be an account used to track particular types or classes of transactions. For example, in an accounting application, accounts may be defined in a chart of accounts such that each account corresponds to specific types of transactions. One account might be used to track rental expenses; another account may be used to track accounting expenses; still further accounts may be used to track foodservice expenses; and the like.

In some embodiments, the system can examine the number of returned records for a given user and a given account to determine whether a sufficient number of records exist in the account for generating an accurate probability distribution for the user. If an insufficient number of records exist in the account for which the probability distribution is to be generated, the system can identify similar accounts for similar users and retrieve transaction data for the identified similar accounts. As discussed, similar accounts for similar users may be identified based on various attributes of a user (e.g., in an accounting application, company size, company type, revenue, etc.) and identification of semantically similar account names in word vectors generated by a word embedding model, such as the Word2Vec model.

In some embodiments, the retrieved transaction records may be filtered to include data considered more relevant at any given point in time. For example, the retrieved transaction records may be filtered to include transactions that have occurred with an amount of time from the current time based on an assumption that more recent activity may be more predictive of future activity than less recent activity. In another example, the retrieved transaction records may be filtered to exclude transactions with properties that appear to be outliers in a data set. The system can perform a statistical analysis of one or more fields in the transaction records (e.g., a transaction amount associated with transactions in an accounting system). Transactions with amounts that are outside of some threshold statistical value (e.g., more than a number of standard deviations away from an average transaction amount for transactions in the account) may be removed from the set of transaction records the system will use to generate a probability distribution.

At block 220, the system generates transaction time gap data from the transaction data. The transaction time gap data represents a time elapsed between each successive transaction in the received transaction data. The generated transaction time gap data may have a size of n−1 records for a data set of n transactions in the account. Each calculated transaction time gap may be calculated for a given level of granularity based on the granularity of the timestamp information included in the transaction record or a predefined level of granularity.

At block 230, the system generates a probability distribution based on the transaction time gap data. The probability distribution generally indicates a likelihood that an unrecorded transaction exists for an account given an elapsed time from a most recent transaction in the account. As discussed above, the probability distribution may be generated using a survival analysis, where each transaction time gap corresponds to a survival duration in the survival analysis. The generated probability distribution may be generated as a monotonically increasing probability curve where a likelihood that an unrecorded transaction exists for the account approaches 1 as the amount of time elapsed between the most recent recorded transaction in the account and the current time increases.

At block 240, the system determines, based on the probability distribution and an elapsed time between a most recent transaction in the account and a current time, a likelihood that an unrecorded transaction exists for the account. The system can determine the likelihood that an unrecorded transaction exists for the account by identifying the probability corresponding to the elapsed time on a probability distribution curve.

At block 250, the system determines whether a determined likelihood that an unrecorded transaction exists for the account exceeds a threshold value. The threshold value may be a user-defined value or a system-defined value used to trigger generation of a user interface to prompt a user of the software application to enter transaction data into the software application.

If the system determines that the likelihood that an unrecorded transaction exists for the account exceeds the threshold value, operations 200 may proceed to block 260. At block 260, the system prompts the user to enter new transaction data for the account. In some embodiments, the system can prompt the user to enter new transaction data for the account by generating a user interface with one or more user interface elements that allow a user to insert the details of one or more transactions and provide those details to the software application or indicate that no unrecorded transactions exist for the account. In embodiments where the software application executes remotely on an application server and is accessed by a client device, the system can transmit information defining the user interface to the client device for display to a user of the client device. In embodiments where the software application executes locally (e.g., on a client device), the system can render the generated user interface on a display coupled to the client device.

If, however, at block 250, the system determines that the determined likelihood that an unrecorded transaction exists for the account does not exceed the threshold value, the system can determine that no action need be taken at the current time to prompt a user to enter transaction data into the software application.

In some embodiments, the system can generate the probability distribution by generating, from the historical transaction time gap data, a stepwise distribution representing a likelihood that a new transaction has been performed after a plurality of time periods from the previous transaction. A continuous probability distribution may be estimated based on the stepwise distribution and a smoothing function.

In some embodiments, the system can generate historical transaction time gap data by determining that the account includes an insufficient data to generate the probability distribution. The system identifies, based on information about the user, transaction data sets for similar users. For each respective transaction data set, the system calculates transaction time gaps between successive transactions in the respective transaction data set and combines the calculated transaction time gaps for each respective transaction data set into an aggregated data set. In some embodiments, the system can identify transaction data sets for similar users by identifying semantically similar account names from accounts associated with a plurality of users of the software application based on a semantic analysis of a name associated with the account and selecting transaction data sets in accounts with the identified similar account names from a corpus of user data.

In some embodiments, when the system has previously used a probability distribution generated from transaction data associated with other users, the system can determine that the account now includes a sufficient amount of data to generate a second probability distribution. Based on the determination, the system can generate a probability distribution for the user based on the user's transaction data instead of transaction data for similar users. To do so, the system can generate second historical transaction time gap data for transactions in the account and a second probability distribution based on the historical transaction time gap data. Using the second probability distribution and the difference between a time associated with the most recent transaction and the current time, the system determines a probability that unrecorded transactions exist for the account.

In some embodiments, the system can automatically generate a transaction record for the account including a predicted transaction date and a predicted transaction description. The predicted transaction date may be calculated based on an elapsed time associated with the threshold probability in the probability distribution and a transaction date of the most recent transaction. The predicted transaction description comprises a description having a highest rate of appearance in the account.

In some embodiments, the system can determine a probable range of values associated with transactions in the account based on a statistical analysis of values associated with the transactions in the account. The system receives user input specifying a value for a new transaction in the account. The system determines that the specified value is outside of the probable range of values and, based on the determination, generates a notification for display to the user that the specified value corresponds to an abnormal value for transactions in the account.

In some embodiments, the system receives, in response to the prompt, an indication that no unrecorded transactions exist for the account. Based on the indication that no unrecorded transactions exist for the account, the system applies a downwards correction factor to the probability distribution such that the threshold probability corresponds to a longer elapsed time than the difference between the time associated with the most recent transaction in the account and the current time.

In some embodiments, the system receives, in response to the prompt, one or more transaction records to add to the account. Based on the receipt of transaction records to add to the account the system applies an upwards correction factor to the probability distribution such that the threshold probability corresponds to a shorter elapsed time than the difference between the time associated with the most recent transaction in the account and the current time.

In some embodiments, the system can determine the probability that an unrecorded transaction exists for the account when a user initiates a session for executing the software application.

Figure 3:
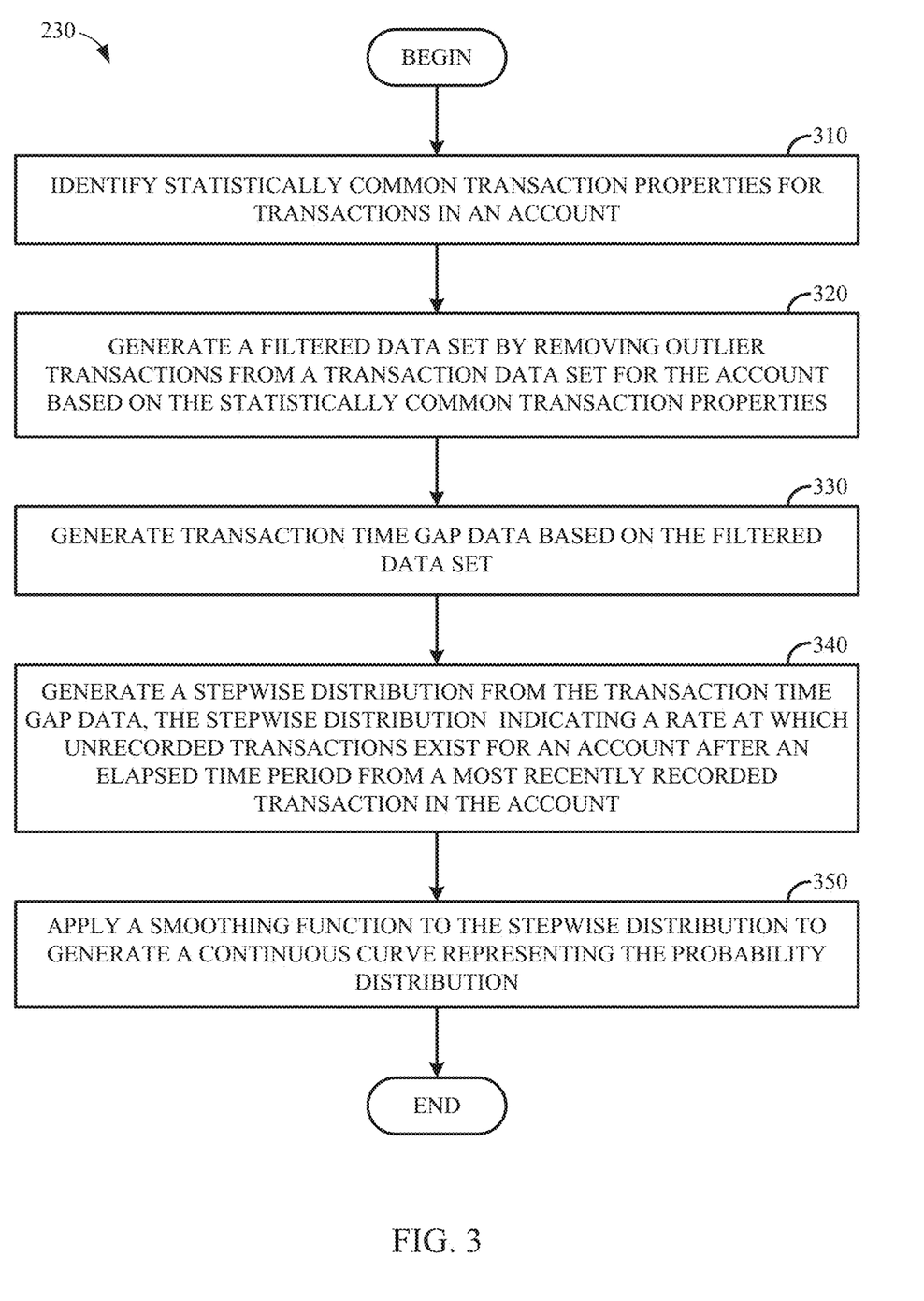
FIG. 3 illustrates example operations for generating a probability distribution used in determining when to generate user interfaces to prompt entry of transactions into the software application.

FIG. 3 illustrates further details regarding example operations 230 (in FIG. 2) for generating the probability distribution indicating a likelihood that an unrecorded transaction exists for an account at a given elapsed time from a most recent transaction.

As illustrated, operations 230 begin at block 310, where a system identifies statistically common transaction properties for transactions in an account. These statistically common transaction properties may include, for example, statistically common transaction amounts, common counterparties, or other transaction properties that are common to a plurality of transactions in the account. By identifying statistically common transaction properties for transactions in an account, the system can remove outliers from a transaction data set to be used in generating the probability distribution, which may reduce an amount of noise present in the data set. Generally, the statistically common transaction properties may be determined a priori for the types of transactions recorded in an account. For example, in an accounting application, the statistically common transaction properties may include a transaction amount. However, other statistically common transaction properties may be contemplated based on the type of transaction recorded in an account.

At block 320, the system generates a filtered data set by removing outlier transactions from a data set for the account based on the statistically common transaction properties. Generally, removing outlier transactions from the data set may include removing transactions having a value for a statistically common property that is more than a number of standard deviations away from an average value of that property. For example, in the accounting application described above, an outlier transaction in a data set may be a transaction having a transaction amount that is more than a number of standard deviations away from an average transaction amount for transactions in the account.

At block 330, the system generates transaction time gap data based on the filtered data set. As discussed above, the generated transaction time gap data may have a size of n−1 for a data set of size n, with each entry in the transaction time gap data representing an elapsed time between two successive transactions in the data set.

At block 340, the system generates a stepwise distribution from the transaction time gap data. The stepwise distribution generally indicates a rate at which unrecorded transactions exist for an account after an elapsed time period from a most recently recorded transaction in the account. In some embodiments, the stepwise distribution may be generated based on a survival analysis, in which each step is associated with an elapsed time from a most recent transaction At block 350, the system applies a smoothing function to the stepwise distribution. By applying the smoothing function to the stepwise distribution, the system can generate continuous curve comprising an estimate of the probability distribution. The smoothing function may be a function that generates a curve that is an optimal fit to the stepwise distribution.

Figure 4:
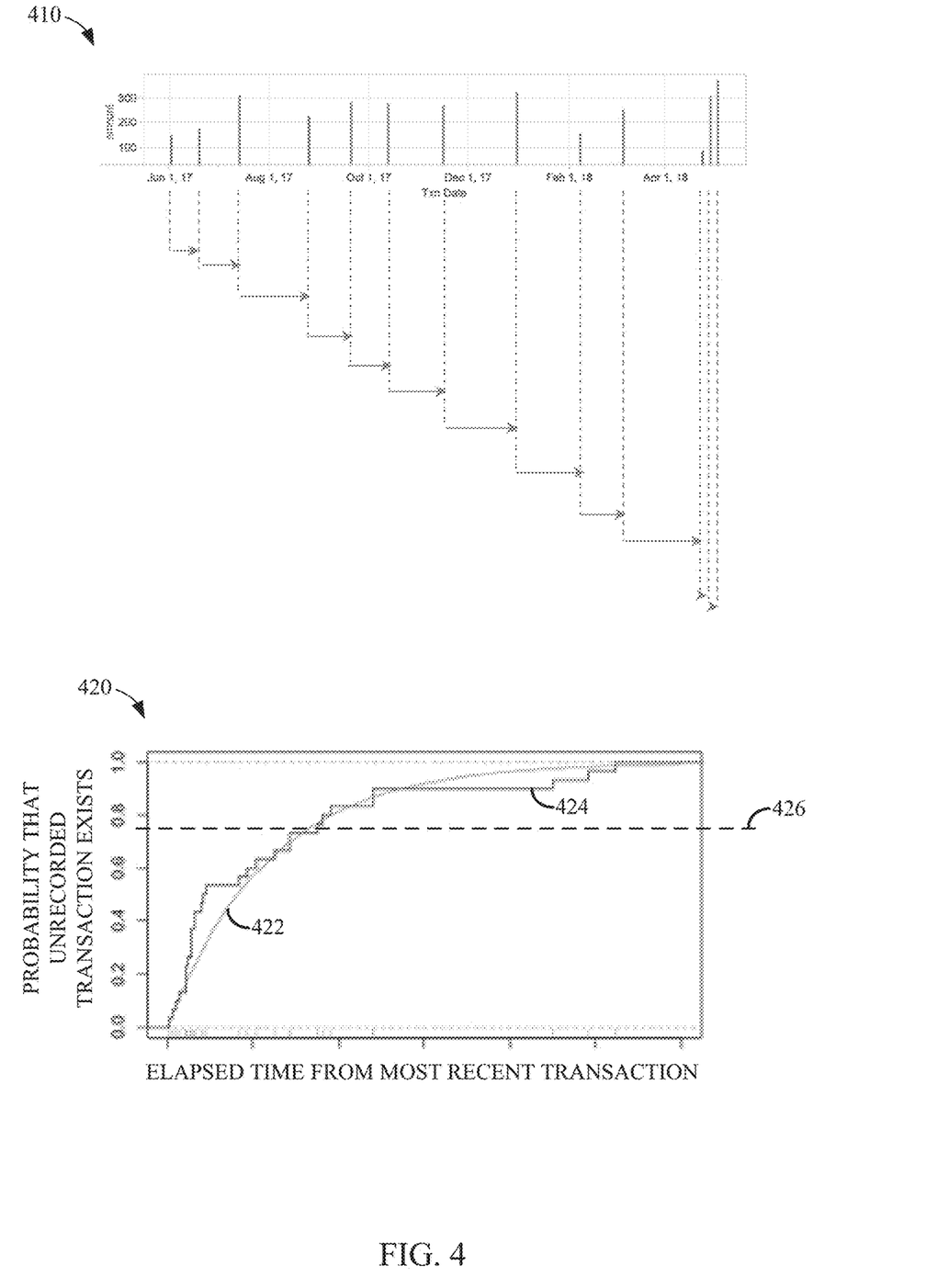
FIG. 4 illustrates transaction time gap data generated from transactions in an account and a probability distribution generated from the transaction time gap data.

Example Transaction Time Gap Data and
Probability Distribution Model Generated from the
Transaction Time Gap Data FIG. 4 illustrates example time gap data 410 and a generated probability distribution 420 used by a software application to determine a likelihood that unrecorded transactions exist in a user's account and generate a user interface to prompt a user to enter transaction details into a software application when a likelihood that unrecorded transactions exist exceeds a threshold value.

Transaction time gap data 410 graphically illustrates transaction time gaps between successive transactions in the user's account. As illustrated, the transaction data set includes 13 transactions and 12 transaction gaps. Each transaction time gap represents an amount of time elapsed between the occurrence of the successive transactions. In some embodiments, as illustrated, transaction amount information may be recorded for the transactions but need not be used in filtering transaction data used in generating the transaction time gap information. As discussed, the transaction amount data may be used in processing transaction details subsequently entered into the software application, as discussed above.

Transaction time gap data 410 may be used to generate a probability distribution model 420, which may be used for determining a likelihood that unrecorded transactions exist in a user's account. This determination may further be the basis on which a user interface is generated to prompt a user to enter transaction details into a software application when a likelihood that unrecorded transactions exist exceeds a threshold value. As illustrated, probability distribution model 420 may include a distribution curve 422 generated from a stepwise distribution 424. Stepwise distribution 424 generally represents the output of a survival model that uses an elapsed time from successive transactions as a survival time value.

In some embodiments, stepwise distribution 424 may be inverted to generate a distribution with a probability value approaching 1 as the amount of time elapsed from the last transaction in a data set increases as opposed to a typical survival stepwise distribution that approaches 0 as the amount of time increases. Distribution curve 422 may be generated using various smoothing or fit functions applied to the stepwise distribution 424. Generally distribution curve 422 may estimate a probability that unrecorded transactions exist based on the stepwise distribution 424.

During operations, a threshold value 426 may be established for determining whether to generate a user interface to prompt a user to enter transaction details into a software application. Threshold value 426 may be defined a priori as a minimum probability that would trigger generation of the user interface to prompt a user to enter transaction details into a software application when a likelihood that unrecorded transactions exist exceeds a threshold value. When the determined likelihood that unrecorded transactions exist in the user's account exceeds threshold value 426, the system can generate the user interface to prompt entry of transaction records or an indication that no unrecorded transactions exist.

In some embodiments, as discussed above, user feedback may be used to adjust probability distribution model 420. Generally, indications that no unrecorded transactions exist in the user's account may cause the system to adjust one of distribution curve 422 or threshold value 426 such that the threshold probability corresponds to a longer elapsed time from a most recent transaction. In this case, distribution curve 422 may be adjusted downwards or threshold value 426 can be adjusted upwards. Similarly, indications that unrecorded transactions exist in the user's account may cause the system to adjust one of distribution curve 422 or threshold value 426 such that the threshold probability corresponds to a shorter elapsed time from a most recent transaction. In this case, distribution curve 422 may be adjusted upwards or threshold value 426 can be adjusted downwards. The amount by which distribution curve 422 or threshold value 426 is adjusted may be predefined by a developer of the software application or by a user of the software application.

Figure 5:
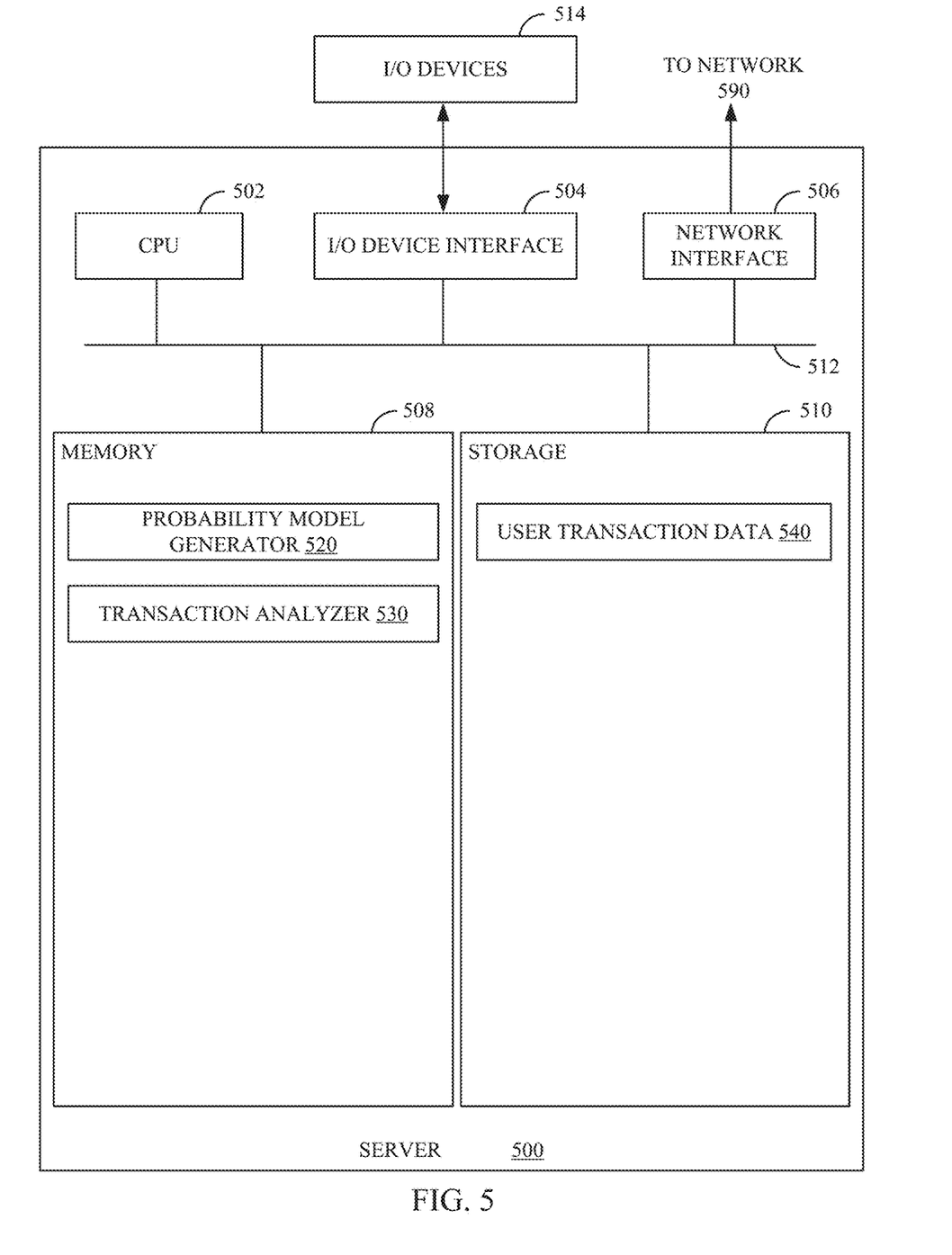
FIG. 5 illustrates an example computing system with which embodiments of the present disclosure may be implemented.

Example Systems for User Interface Generation to Prompt Users to Record Transactions in a Software Application Based on a Probability Distribution Model FIG. 5 illustrates an example server 500 on which probability distribution models may be generated and used to predict when a user has unrecorded transactions in an account, with those predictions being used to generate user interfaces to prompt users to record transactions in a software application. For example, server 500 may be representative of application server 120 illustrated in FIG. 1.

As shown, server 500 includes a central processing unit (CPU) 502, one or more I/O device interfaces 504 that may allow for the connection of various I/O devices 515 (e.g., keyboards, displays, mouse devices, pen input, etc.) to the server 500, network interface 506 through which server 500 is connected to network 590 (which may be a local network, an intranet, the internet, or any other group of computing devices communicatively connected to each other), a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes a probability model generator 520 and a transaction analyzer 530. Probability model generator 520 may be representative of probability distribution model generator 122 illustrated in FIG. 1, and transaction analyzer 530 may be representative of account analyzer 124 illustrated in FIG. 1. Probability model generator 520 generally retrieves transaction data from user transaction data 540 in storage 510 or a remote data store (e.g., user data store 130 illustrated in FIG. 1). Using the retrieved transaction data, probability model generator 520 generates transaction time gap data and uses the transaction time gap data to generate a probability distribution representing a likelihood that an unrecorded transaction exists for a user's account for any given amount of time elapsed from the most recent recorded transaction in the user's account. As discussed, probability model generator 520 can generate the probability model based on a survival analysis and a smoothing function applied to a stepwise distribution generated from the survival analysis.

Transaction analyzer 530 generally uses the probability distribution generated by probability model generator 520 and an elapsed time between the most recent transaction recorded for the user's account and the current time to determine a likelihood that an unrecorded transaction exists for the user's account. As discussed above with respect to account analyzer 124 illustrated in FIG. 1, transaction analyzer can generate a user interface prompting a user to enter transaction information or an indication that no unrecorded transactions exist for the user's account if the determined likelihood that an unrecorded transaction exists for the user's account exceeds a predefined threshold value Storage 510 is representative of a non-volatile memory, such as a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN). Storage 510, as illustrated, may include user transaction data 540. User transaction data 540 generally represents a data repository in which transaction records for various users and various user accounts can be stored. The transaction records, as discussed, can be retrieved by probability model generator 520 to generate transaction time gap data and a probability distribution based on the transaction time gap data, as discussed above.

Figure 6:
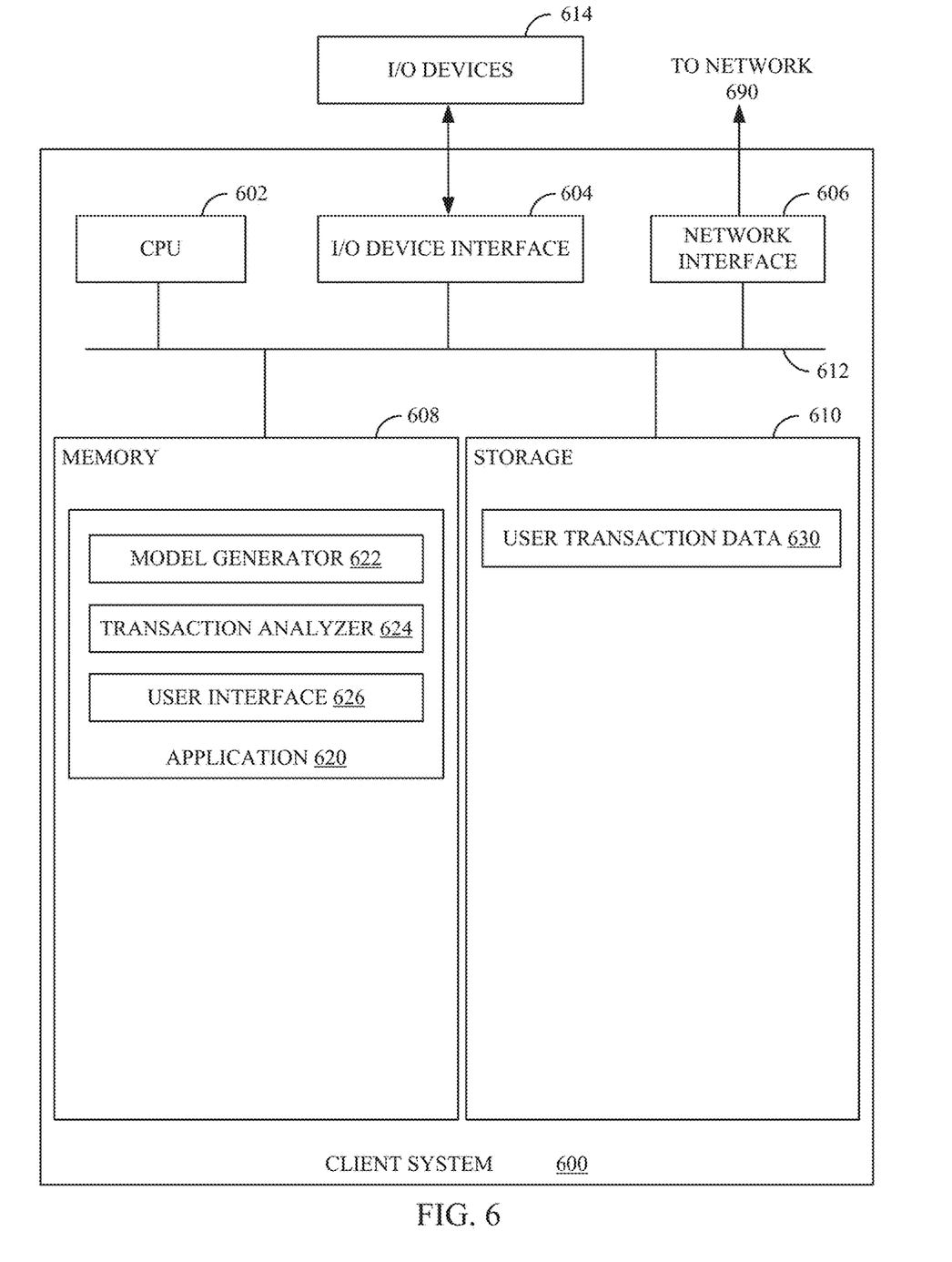
FIG. 6 illustrates an example client device on which embodiments of the present disclosure may be implemented.

FIG. 6 illustrates an example client 600 on which an application that uses a probability distribution generated from transaction time gap information to determine whether to prompt a user to provide transaction information to a software application.

As shown, client 600 includes a central processing unit (CPU) 602, one or more I/O device interfaces 604 that may allow for the connection of various I/O devices 616 (e.g., keyboards, displays, mouse devices, pen input, etc.) to the client 600, network interface 606 through which client 600 is connected to network 690 (which may be a local network, an intranet, the internet, or any other group of computing devices communicatively connected to each other), a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes an application 620. Application 620 may represent a standalone application installed on a client device that allows a user to maintain a transaction leger and perform analyses on the transactions recorded in the transaction ledger. Application 620 generally includes a model generator 622, a transaction analyzer 624, and a user interface 626. Model generator 622 generally retrieves transaction data from user transaction data 630 in storage 610 or a remote data store (e.g., user data store 130 illustrated in FIG. 1). Using the retrieved transaction data, model generator 622 generates transaction time gap data and uses the transaction time gap data to generate a probability distribution representing a likelihood that an unrecorded transaction exists for a user's account for any given amount of time elapsed from the most recent recorded transaction in the user's account. As discussed, model generator 622 can generate the probability model based on a survival analysis and a smoothing function applied to a stepwise distribution generated from the survival analysis.

Transaction analyzer 624 generally uses the probability distribution generated by model generator 622 and an elapsed time between the most recent transaction recorded for the user's account and the current time to determine a likelihood that an unrecorded transaction exists for the user's account. If the determined likelihood that an unrecorded transaction exists for the user's account exceeds a predefined threshold value, transaction analyzer 624 can generate a user interface 626 that displays a prompt to provide transaction records to application 620.

User interface 626 may be generated by transaction analyzer 624 dynamically based on a determination that a likelihood that an unrecorded transaction exists for a user's account exceeds a threshold value. User interface 626 may include one or more user interface elements that are displayed on a screen coupled to the client device 600 that allow a user to provide details about unrecorded transaction (e.g., transaction date, description, amount, etc.) or indicate to the system that no unrecorded transactions exist.

Storage 610 is representative of a non-volatile memory, such as a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN). Storage 610, as illustrated, may include user transaction data 630. User transaction data 630 generally represents a data repository in which transaction records for various users and various user accounts can be stored. The transaction records, as discussed, can be retrieved by model generator 622 to generate transaction time gap data and a probability distribution based on the transaction time gap data, as discussed above.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for generating a user interface prompt to perform an action in a software application, comprising:
   determining, by an application server, for an account on the application server accessed by a client device, whether a sufficient number of records exist in the account for generating a probability distribution model based on historical transaction time gap data for the account;
   generating historical transaction time gap data for transactions in the account, the historical transaction time gap data comprising a data set of elapsed times between each successive transaction in the account;

determining that there is not a sufficient number of records existing for the account;

based on determining that there is not the sufficient number of records existing for the account:

identifying, by the application server, similar accounts on the application server using semantic similarity:

retrieving, by the application server, transaction data for the similar accounts; and adding, by the application server, additional historical transaction time gap data determined from the retrieved transaction data to the historical transaction time gap data for the account;

generating a probability distribution model based on the historical transaction time gap data, the probability distribution model representing a distribution of probabilities that a new transaction has been performed after an elapsed time from a previous transaction, wherein the probability distribution model comprises a model trained based on an inverted stepwise survival analysis of the historical transaction time gap data such that an inverse of a survival rate indicates a probability that unrecorded transactions exist for the account, wherein the inverted stepwise survival analysis comprises a Kaplan-Meier estimation over multiples of a base time period smoothed based on a Weibull distribution;

determining, based on the probability distribution model and a difference between a time associated with a most recent transaction in the account and a current time, a probability that an unrecorded transaction exists for the account;

determining that the probability that an unrecorded transaction exists for the account exceeds a threshold probability;

receiving from the client device, an indication whether the unrecorded transaction exists;

adjusting the probability distribution model based on the indication received;

generating a prompt to enter new transactions for the account including one or more user interface elements based on determining that the probability that an unrecorded transaction exists for the account exceeds the threshold probability;

automatically creating a record associated with the unrecorded transaction, the record including predicted data for the unrecorded transaction, based on determining that the probability that the unrecorded transaction exists for the account exceeds the threshold probability; and transmitting the generated prompt to the client device.

2. The method of claim 1, wherein generating the probability distribution model comprises:

generating, from the historical transaction time gap data, a stepwise distribution representing a likelihood that a new transaction has been performed after a plurality of time periods from the previous transaction; and estimating a continuous probability distribution based on the stepwise distribution and a smoothing function.

3. The method of claim 1, wherein generating the historical transaction time gap data comprises:

determining that the account includes an insufficient data to generate the probability distribution model;

identifying, based on information about a user, transaction data sets for similar users;

for each respective transaction data set, calculating transaction time gaps between successive transactions in the respective transaction data set; and combining the calculated transaction time gaps for each respective transaction data set into an aggregated data set.

4. The method of claim 3, wherein identifying transaction data sets for similar users comprises:

identifying semantically similar account names from accounts associated with a plurality of users of the software application based on a semantic analysis of a name associated with the account; and selecting transaction data sets in accounts with the identified semantically similar account names from a corpus of user data.

5. The method of claim 3, further comprising:

determining that the account includes a sufficient amount of data to generate a second probability distribution;

generating second historical transaction time gap data for transactions in the account;

generating the second probability distribution based on the historical transaction time gap data; and using the second probability distribution and the difference between a time associated with the most recent transaction and the current time to determine a probability that unrecorded transactions exist for the account.

6. The method of claim 1, further comprising:

automatically generating a transaction record for the account including a predicted transaction date and a predicted transaction description, wherein:

the predicted transaction date is calculated based on an elapsed time associated with the threshold probability in the probability distribution model and a transaction date of the most recent transaction, and the predicted transaction description comprises a description having a highest rate of appearance in the account.

7. The method of claim 1, further comprising:

determining a probable range of values associated with transactions in the account based on a statistical analysis of values associated with the transactions in the account;

receiving user input specifying a value for a new transaction in the account;

determining that the specified value is outside of the probable range of values; and based on the determining, generating a notification for display to a user that the specified value corresponds to an abnormal value for transactions in the account.

8. The method of claim 1, further comprising:

receiving, in response to the prompt, an indication that no unrecorded transactions exist for the account; and applying a downwards correction factor to the probability distribution model such that the threshold probability corresponds to a longer elapsed time than the difference between the time associated with the most recent transaction in the account and the current time.

9. The method of claim 1, further comprising:

receiving, in response to the prompt, one or more transaction records to add to the account; and applying an upwards correction factor to the probability distribution model such that the threshold probability corresponds to a shorter elapsed time than the difference between the time associated with the most recent transaction in the account and the current time.

10. The method of claim 1, wherein determining the probability that an unrecorded transaction exists for the account is performed when a user initiates a session for executing the software application, the method further comprising, during the session:
- in response the indication comprising a selection of a specific user interface element or an entry of a non-null record into a mandatory transaction field, applying an upwards correction factor to the probability distribution model such that the threshold probability corresponds to a shorter elapsed time than the difference between the time associated with the most recent transaction in the account and the current time; and
- in response to the indication comprising a selection of a different user interface element or an entry of a null value in the mandatory transaction field, applying a downwards correction factor to the probability distribution model such that the threshold probability corresponds to a longer elapsed time than the difference between the time associated with the most recent transaction in the account and the current time.

11. A system, comprising:
a processor; and
a memory having instructions stored thereon which, when executed by the processor, performs an operation for generating a user interface to prompt a user to perform an action in a software application, the operation comprising:
- determining, by an application server, for an account on the application server accessed by a client device, whether a sufficient number of records exist in the account for generating a probability distribution model based on historical transaction time gap data for the account;
- generating historical transaction time gap data for transactions in the account, the historical transaction time gap data comprising a data set of elapsed times between each successive transaction in the account;
- determining that there is not a sufficient number of records existing for the account;
- based on determining that there is not the sufficient number of records existing for the account:
  - identifying, by the application server, similar accounts on the application server using semantic similarity;
  - retrieving, by the application server, transaction data for the similar accounts; and
  - adding, by the application server, additional historical transaction time gap data determined from the retrieved transaction data to the historical transaction time gap data for the account;
- generating a probability distribution model based on the historical transaction time gap data, the probability distribution model representing a distribution of probabilities that a new transaction has been performed after an elapsed time from a previous transaction, wherein the probability distribution model comprises a model trained based on an inverted stepwise survival analysis of the historical transaction time gap data such that an inverse of a survival rate indicates a probability that unrecorded transactions exist for the account, wherein the inverted stepwise survival analysis comprises a Kaplan-Meier estimation over multiples of a base time period smoothed based on a Weibull distribution;
- determining, based on the probability distribution model and a difference between a time associated with a most recent transaction in the account and a current time, a probability that an unrecorded transaction exists for the account;
- determining that the probability that an unrecorded transaction exists for the account exceeds a threshold probability;
- receiving from the client device, an indication whether the unrecorded transaction exists;
- adjusting the probability distribution model based on the indication received;
- generating a prompt to enter new transactions for the account including one or more user interface elements based on determining that the probability that an unrecorded transaction exists for the account exceeds the threshold probability;
- automatically creating a record associated with the unrecorded transaction, the record including predicted data for the unrecorded transaction, based on determining that the probability that the unrecorded transaction exists for the account exceeds the threshold probability; and
- transmitting the generated prompt to the client device.

12. The system of claim 11, wherein generating the probability distribution model comprises:
- generating, from the historical transaction time gap data, a stepwise distribution representing a likelihood that an new transaction has been performed after a plurality of time periods from the previous transaction; and
- estimating a continuous probability distribution based on the stepwise distribution and a smoothing function.

13. The system of claim 11, wherein generating the historical transaction time gap data comprises:
- determining that the account includes an insufficient data to generate the probability distribution model;
- identifying, based on information about a user, transaction data sets for similar users;
- for each respective transaction data set, calculating transaction time gaps between successive transactions in the respective transaction data set; and
- combining the calculated transaction time gaps for each respective transaction data set into an aggregated data set.

14. The system of claim 13, wherein identifying transaction data sets for similar users comprises:
- identifying semantically similar account names from accounts associated with a plurality of users of the software application based on a semantic analysis of a name associated with the account; and
- selecting transaction data sets in accounts with the identified semantically similar account names from a corpus of user data.

15. The system of claim 13, wherein the operation further comprises:
- determining that the account includes a sufficient amount of data to generate a second probability distribution;
- generating second historical transaction time gap data for transactions in the account;
- generating the second probability distribution based on the historical transaction time gap data; and
- using the second probability distribution and the difference between a time associated with the most recent transaction and the current time to determine a probability that unrecorded transactions exist for the account.

16. The system of claim 11, wherein the operation further comprises:

automatically generating a transaction record for the account including a predicted transaction date and a predicted transaction description, wherein:

the predicted transaction date is calculated based on an elapsed time associated with the threshold probability in the probability distribution model and a transaction date of the most recent transaction, and the predicted transaction description comprises a description having a highest rate of appearance in the account.

17. The system of claim 11, wherein the operation further comprises:

determining a probable range of values associated with transactions in the account based on a statistical analysis of values associated with the transactions in the account;

receiving user input specifying a value for a new transaction in the account;

determining that the specified value is outside of the probable range of values; and based on the determining, generating a notification for display to a user that the specified value corresponds to an abnormal value for transactions in the account.

18. The system of claim 11, wherein the operation further comprises:

receiving, in response to the prompt, an indication that no unrecorded transactions exist for the account; and applying a downwards correction factor to the probability distribution model such that the threshold probability corresponds to a longer elapsed time than the difference between the time associated with the most recent transaction in the account and the current time.

19. The system of claim 11, wherein the operation further comprises:

receiving, in response to the prompt, one or more transaction records to add to the account; and applying an upwards correction factor to the probability distribution model such that the threshold probability corresponds to a shorter elapsed time than the difference between the time associated with the most recent transaction in the account and the current time.

20. A non-transitory computer-readable medium having instructions stored thereon which, when executed by a processor, performs an operation for generating a user interface to prompt a user to perform an action in a software application, the operation comprising:

determining, by an application server, for an account on the application server accessed by a client device, whether a sufficient number of records exist in the account for generating a probability distribution model based on historical transaction time gap data for the account;

generating historical transaction time gap data for transactions in the account, the historical transaction time gap data comprising a data set of elapsed times between each successive transaction in the account;

determining that there is not a sufficient number of records existing for the account;

based on determining that there is not the sufficient number of records existing for the account:

identifying, by the application server, similar accounts on the application server using semantic similarity;

retrieving, by the application server, transaction data for the similar accounts; and adding, by the application server, additional historical transaction time gap data determined from the retrieved transaction data to the historical transaction time gap data for the account;

generating a probability distribution model based on the historical transaction time gap data, the probability distribution model representing a distribution of probabilities that a new transaction has been performed after an elapsed time from a previous transaction, wherein the probability distribution model comprises a model trained based on an inverted stepwise survival analysis of the historical transaction time gap data such that an inverse of a survival rate indicates a probability that unrecorded transactions exist for the account, wherein the inverted stepwise survival analysis comprises a Kaplan-Meier estimation over multiples of a base time period smoothed based on a Weibull distribution;

determining, based on the probability distribution model and a difference between a time associated with a most recent transaction in the account and a current time, a probability that an unrecorded transaction exists for the account;

determining that the probability that an unrecorded transaction exists for the account exceeds a threshold probability;

receiving from the client device, an indication whether the unrecorded transaction exists;

adjusting the probability distribution model based on the indication received;

generating a prompt to enter new transactions for the account including one or more user interface elements based on determining that the probability that an unrecorded transaction exists for the account exceeds the threshold probability;

automatically creating a record associated with the unrecorded transaction, the record including predicted data for the unrecorded transaction, based on determining that the probability that the unrecorded transaction exists for the account exceeds the threshold probability; and transmitting the generated prompt to the client device.

21. The method of claim 1, wherein the application server determines semantic similarity using a common transaction amount and a common counterparty.

* * * * *